March 21, 1961 R. C. HARRISON 2,976,055
SUPPORT FOR TRAILER TONGUE
Filed Nov. 3, 1959
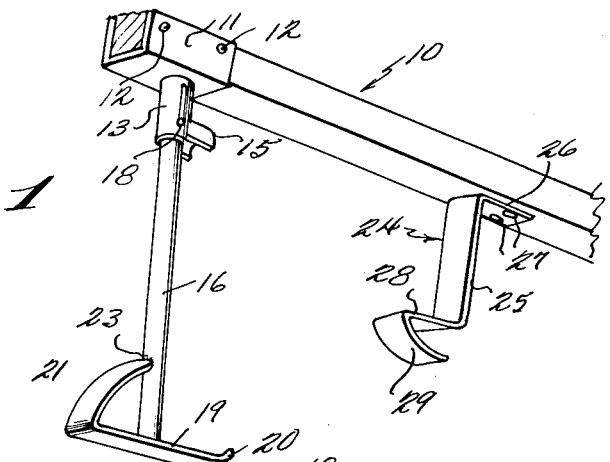
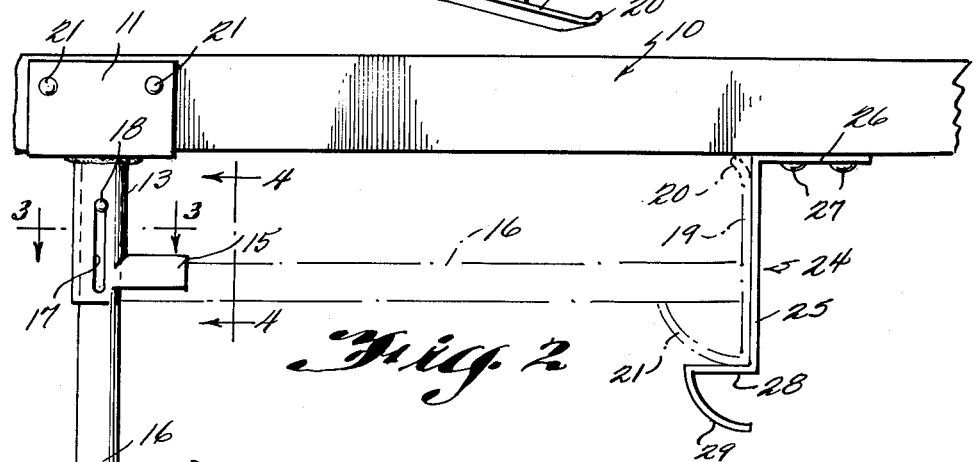
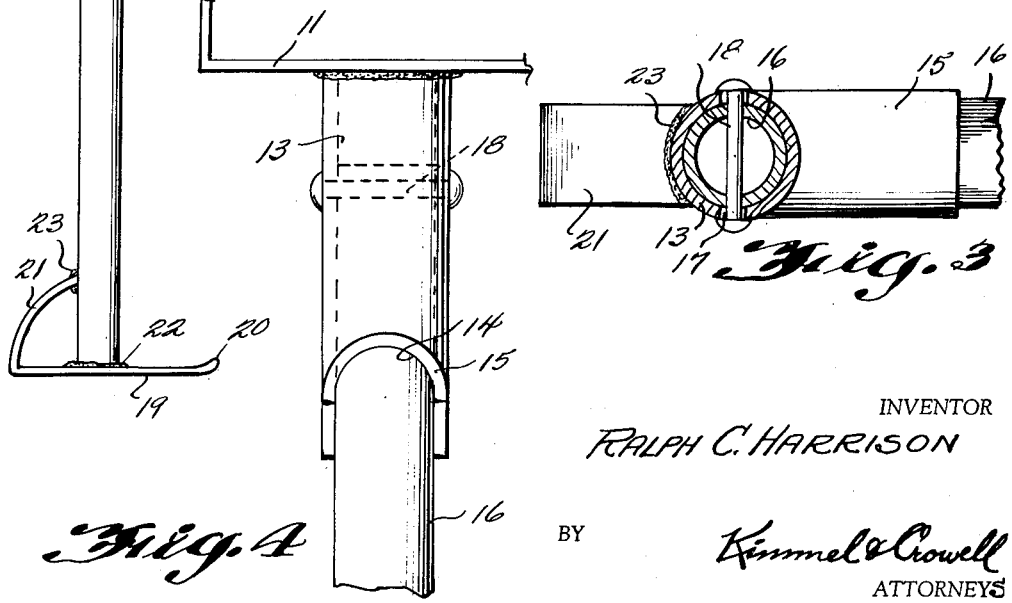
INVENTOR
RALPH C. HARRISON
BY
Kimmel & Crowell
ATTORNEYS

United States Patent Office 2,976,055
Patented Mar. 21, 1961

2,976,055
SUPPORT FOR TRAILER TONGUE
Ralph C. Harrison, 1709 Johnson St., Beloit, Wis.
Filed Nov. 3, 1959, Ser. No. 850,666
1 Claim. (Cl. 280—150.5)

This invention relates to a support for a trailer tongue and has particularly applicability to such a support for a tongue for a boat trailer.

A primary object of this invention is the provision of a support for a boat trailer which is adapted to hold the trailer and its associated boat in vertical untilted position, when the trailer tongue is not attached to a towing vehicle.

An additional object of the invention is the provision of such a device having a supporting foot, which will prevent the standard of the device from sinking into soft ground, when utilized in such a location.

A further object of the invention is the provision of a device of this character which may be readily folded into a horizontal position beneath the trailer tongue when not in use.

Still another object of the invention is the provision of a spring clip means adapted to hold the support in inoperative position, which may be released with a minimum of effort and difficulty, and which will be automatically actuable to hold the support, when the same is pivotally swung into position beneath the trailer tongue.

Still other objects reside in the combinations of elements, arrangements of parts, and features of construction.

Still other objects will in part be obvious, and in part be pointed out hereinafter and shown in the accompanying drawing wherein there is disclosed a preferred embodiment of this inventive concept.

In the drawing:

Figure 1 is a perspective view showing one form of support in accordance with the instant invention, in operative or extended position beneath a boat trailer tongue, the latter being partially broken away;

Figure 2 is an enlarged side elevational view of the construction of Figure 1, the support being shown in retracted or inoperative position in dotted lines;

Figure 3 is an enlarged sectional view taken substantially along the line 3—3 of Figure 1, as viewed in the direction indicated by the arrows; and Figure 4 is an enlarged sectional view taken substantially along the line 4—4 of Figure 2, as viewed in the direction indicated by the arrows.

Similar reference characters refer to similar parts throughout the several views of the drawing.

Having reference now to the drawing in detail, there is shown at 10 a fragment of a trailer tongue, which may be secured at one end to a conventional boat trailer (not shown), and which may at its other end be provided with a conventional hitch arrangement for securing the device to a towing vehicle (not shown).

The device of the instant invention comprises an elongated U-shaped bracket 11, the legs of which are suitably secured on opposite sides of the trailer tongue, as by means of bolts or screws 12. The bracket 11 may be of any desired configuration to fit any desired shape of trailer tongue. The bight or underside of the bracket is provided with a substantially cylindrical socket 13, the lower inner side of which is cut away, as indicated at 14 (see Fig. 4), and provided with a transverse semi-circular extending member 15, which extends rearwardly beneath the tongue 10. A tubular standard 16 of a diameter to seat within the socket 13 is also provided, the standard 16 being provided with a transversely disposed pin 18 adjacent its end. The pin 18 engages in oppositely disposed elongated slots 17 in socket 13 which extend from a point adjacent its connection with the underside of the bracket 11 nearly to the bottom thereof. The arrangement is such that the standard 16 may seat firmly in the socket 13, when in the position shown in full lines in Fig. 2, but when moved to the position shown in dotted lines in Fig. 2, which is permitted by the slots 17, may be readily swung about the pin 18, the latter serving as an axle, to the position shown in dotted lines in Fig. 2. The lower portion of the tubular standard 16 is provided with an elongated foot 19, which has an upturned end portion 20 at one end, and a rearwardly reverted extension 21 at the other end. The foot portion 19 is suitably secured as by welding 22 to the bottom of the standard or support 16, while the inner end of the reverted portion 21 is also secured as by welding 23 to the standard 16 at a point spaced above the bottom thereof.

Means are provided for retaining the supporting member in horizontal position beneath the trailer tongue 10, and take the form of a generally L-shaped bracket member 24 having a vertical shank 25, and a securing portion 26, which is integral therewith, extending at right angles thereto, the latter being secured to the underside of the tongue 10 as by means of bolts or screws 27. The lower end of shank portion 25, which is comprised of flat resilient strip material, preferably metal, is formed with an integral horizontal portion 28, which extends inwardly toward the support 16. The outer portion of 28 has a reverted offset tip portion 29, which is arcuate and which forms in conjunction with the arcuate tip 20 of the foot 19 a cam surface, the arrangement being such that when the support 16 is swung upwardly to the dotted line position of Fig. 2, arcuate portion 20 cams with portion 29 to force resilient member 25 rearwardly to permit the shank to override the portion 28 and seat in horizontal relation, with the portion 21 being supported by the portion 28 to retain the support 16 in horizontal position.

When it is desired to release support 16 to permit the same to swing by gravity to vertical position, pressure is exerted on the portion 28 to move the shank 25 rearwardly away from the foot 19, to disengage the parts 21 and 28. The assembly then falls to vertical position, and upon proper alignment of the support 16 with socket 13, the weight of the trailer tongue 10 will assemble the parts fixedly to support the trailer tongue in substantially horizontal position.

From the foregoing it will now be seen that there is herein provided an improved support for a boat trailer tongue which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A support for a trailer tongue comprising, in combination, a tubular socket having elongated aligned slots therein, secured to the underside of said tongue, a pin extending transversely across said socket through said slots, a tubular support having aligned openings in the upper end thereof, said pin extending through said openings, an offset semi-cylindrical downwardly opening portion extending transversely of said socket at the lower end thereof in alignment with said pin and adapted to receive said support when said pin is in its lowermost position relative to said slots and said support is swung to horizontal position, a foot on said support, and a resilient clip secured to the underside of said tongue engageable with said foot for holding said support in inoperative horizontal position beneath said tongue, said foot including an extending arcuate tip portion, and said clip having a horizontally offset portion and a lower arcuate portion, said tip portion and said lower arcuate portion effecting a cam action to displace said resilient clip and seat said foot on said horizontal offset portion, said foot having an extending reverted portion on the side thereof opposite said extending arcuate tip, said reverted portion seating on the horizontal offset portion of said clip.

References Cited in the file of this patent

UNITED STATES PATENTS

| | | |
|---|---|---|
| 110,197 | Buchanan | Dec. 20, 1870 |
| 2,162,181 | Skinner | June 13, 1939 |
| 2,525,506 | Wiedman | Oct. 10, 1950 |
| 2,634,941 | Eckert | Apr. 14, 1953 |